March 4, 1958     H. E. UNDERHILL     2,825,391
READILY PORTABLE FOLDING SEAT
Filed Nov. 23, 1956
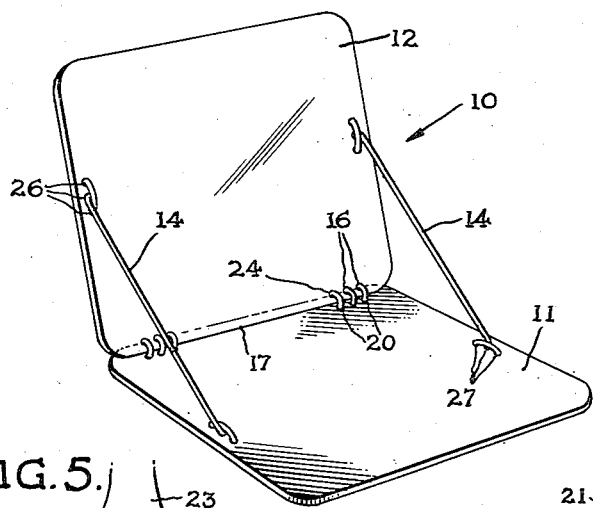
FIG. 1.
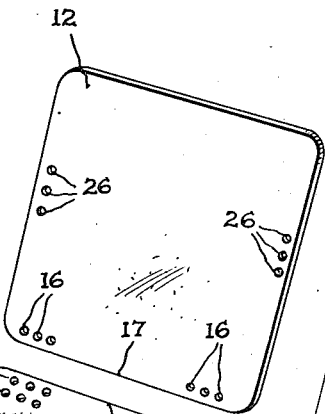
FIG. 3.
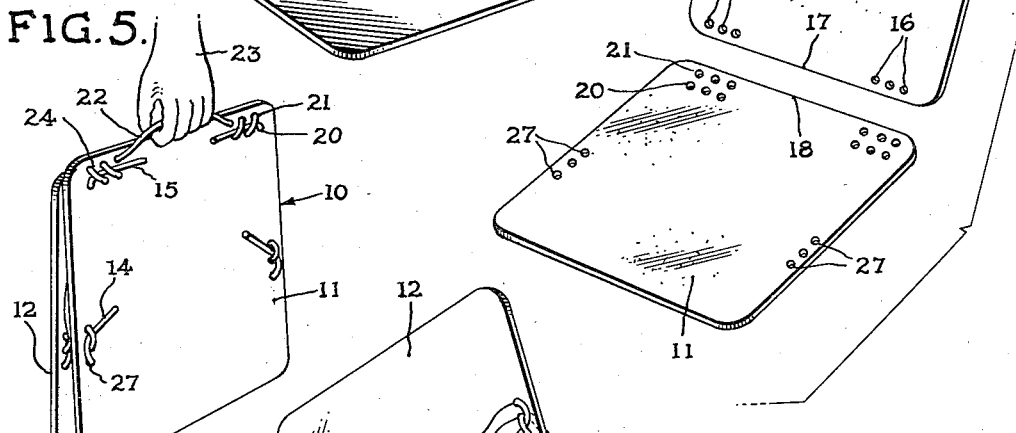
FIG. 5.
FIG. 2.
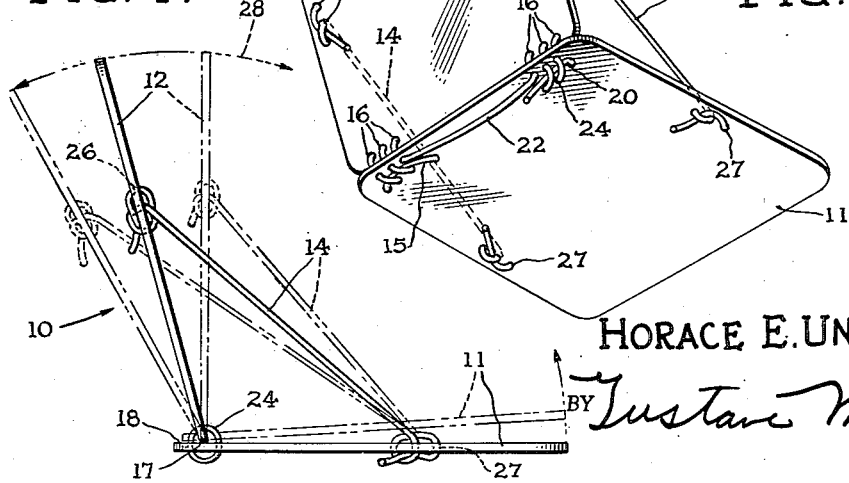
FIG. 4.
INVENTOR
HORACE E. UNDERHILL
BY Gustave Miller
ATTORNEY

United States Patent Office 2,825,391
Patented Mar. 4, 1958

2,825,391

READILY PORTABLE FOLDING SEAT

Horace E. Underhill, Summit, Oreg.

Application November 23, 1956, Serial No. 623,856

1 Claim. (Cl. 155—153)

This invention relates to a readily portable folding seat and has for an object to provide an improved folding seat which is easily carried as needed.

A further object of this invention is to provide a readily portable folding seat including a back and seat member having an improved combination hinging and handle means for the back and seat member.

A further object of this invention is to provide a readily portable folding seat made of inexpensive material such as hardboard, which term includes thin plyboard, molded press board, or similar material which are light in weight, inexpensive in cost, and easy to shape and to secure together by the improved hinged and handle means of this invention.

Still a further object of this invention is to provide a readily portable seat that is lightweight and easy to carry for use when needed, such as sport events, particularly where the usual seat provided may be merely a bench without any back rest, the portable seat of this invention being easily carried in the hand by the combination handle and hinging means from one's home or car to the location where it is to be utilized.

Still a further object of this invention is to provide a folding portable seat having adjustable side brace means permitting the seat and back members to be folded to a parallel position, or to be opened up and held to a desired angle to each other, the angle being approximately a right angle, which angle is adjustable by merely adjusting the flexible brace members limiting the opening of the seat member relative to the back member.

A further object of this invention is to provide a portable folding seat wherein the back rest member is secured by an improved hinging means with its edge in abutting relation on top of the seat member adjacent its hinging edge.

Still a further object of this invention is to provide a readily portable folding seat which can be used time and again, and which when not in use will occupy a minimum of space with the back rest member folded into substantially parallel relationship with the seat member.

With the foregoing and other objects in view, as will hereinafter become apparent, this invention comprises the constructions, combinations and arrangements of parts hereinafter set forth, claimed, and disclosed in the accompanying drawing, wherein:

Fig. 1 is a perspective view of the readily portable seat member of this invention as viewed from above.

Fig. 2 is a similar perspective view as viewed from the bottom.

Fig. 3 is a detailed perspective view of the back rest member and seat rest member before assembling.

Fig. 4 is a side edge view of the portable seat illustrating the adjustability of the angle of the back rest member to the seat member.

Fig. 5 is a perspective view of the portable seat of this invention being carried by means of the handle and hinge means.

There is shown at 10 the readily portable folding seat of this invention. The seat 10 is made up of a seat member 11, a back rest member 12, adjustable cord brace means 14, limiting the angle to which the back rest may be set relative to the seat member as shown in Fig. 4, and a combination handle and hinging cord 15 tying the back rest member 12 to the seat rest member 11.

As shown, the back rest member 12 is provided with one or more holes or apertures 16 located in spaced apart relation adjacent the opposite ends of the hinging edge 17 of the back rest member 12, it being observed that the apertures 16 are fairly close to the hinging edge 17. Adjacent the opposite ends of the hinging edge 18 of the seat member 11 there is provided one or more pairs of holes 20 and 21, the pairs of holes 20 and 21 being in the same relation to the ends of the hinging edge 18 that the holes or apertures 16 are in relation to the ends of the hinging edge 17, and the holes at each end of each hinging are in spaced relation to each other. At a minimum, only one hole 16 is necessary adjacent each end and only one pair of holes 20 and 21 are similarly needed adjacent each end, but for convenience and in order to provide a stronger hinge, a plurality of holes 16 such as 3 may be provided at each end of the back rest hinging edge 17, and a corresponding plurality of pairs of holes 20 and 21 are similarly provided adjacent the end of the hinging edge 18 of the seat member 11.

The combination hinge and seat cord 15 is threaded through the spaced apart holes 21 on the bottom of the seat member 11 then through the back of the spaced apart holes 16 and then down into and through the adjoining aperture 20 of the pair. If only a single hole is provided adjacent each end of the back rest hinging edge 17 and seat member hinging edge 18, then the ends of the cords would be tied at this point, but if a plurality of holes are used such as illustrated, the ends of the cord 15 are next threaded through the next adjacent aperture 21 up over the back and through the next adjacent aperture 16 and down through the adjacent aperture 20 of the pair and then again as illustrated, and then the ends of the cord may be pulled through the loops formed at the bottom of the seat member as illustrated in Fig. 2. The ends of the cord may be suitably tied in any convenient manner, but when the cord is a plastic type of cord of appropriate strength, it has been found that merely extending the ends of the cords through the loops formed in the bottom of the seat member 11 is sufficient to provide a tying action and securely hold the cord 15 in position. As thus assembled, the cord 15 provides a combination carrying handle as at 22 extending between the spaced apart apertures for being readily held in the hand 23, and a seat hinge at each end as at 24. Due to the fact that a pair of holes or a series of pairs of holes are provided in the seat member 11 and only a single hole or series of single holes are provided at 16 in the back rest member 12, the hinging edge 17 of the back rest member 12 when in the operating position as shown in Figs. 1 and 4 is held in abutting relation on the top of the seat member 11 adjacent the hinging edge 18 and between the holes 20 and 21 as clearly apparent in Fig. 4.

Brace means 14 are provided for holding the back rest member 12 at a desired adjustable angle relative to the seat member 11 when in open position. As shown in Fig. 4, the angle of the back rest member 12 to the seat member 11 may be adjusted due to the construction as will now be described. The brace member 14 consists of a cord similar to the cord 15, and it is threaded through and tied through one or more apertures located in the opposite side of both the back rest member 12 and the seat member 11 intermediate their hinging edges 17 and 18 and the edges opposite the hinging edges, these apertures being shown at 24. One end of the brace cord 14 is threaded through one or more of the apertures 24 and the other end is threaded similarly through the one or more apertures 25 (not shown). When three apertures 24 and 25 are used as illustrated, the cord 14 is threaded from the front of the seat member 11 and back rest member 12 through the central aperture then back through one end aperture across the front and down through the other end aperture and then passed under the loop formed between the central aperture and first end aperture used where it may be held in position by the tension of the loop thereon, although if desired a suitable tying knot may be made at each end of the brace cord 14. When made of the same plastic cord as the cord 15, the loop itself in many cases is sufficient to hold both ends of the bracing cord in position.

If the angle of the back rest member 12 to the seat rest member 11 is not suitable to the user, the length of the brace cord 14 may be shortened or lengthened by merely untying the end and making an appropriate adjustment.

Thus, it will be seen that there has been provided a readily portable foldable seat wherein the back rest 12 and the seat member 11 may be folded toward each other as shown by the arrows 28 in Fig. 4 and may be easily carried by the hand 23 on the combination hinge and handle 22. The term hardboard, of course, includes plywood, pressed wood, molded wood, or plastic material or any other suitable lightweight yet fairly rigid sheet material of sufficient strength, and all the edges of the seat member 11 and back rest member 12 may be substantially straight except for the corners which are suitably rounded off to avoid having any sharp projections. In addition, the seat member 11 and back rest member 12 may be cut from any single piece of material, and may be cut apart as along the hinging edges to provide the two pieces of identical material.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A readily portable folding seat comprising a seat member and a back rest member hinged thereto, the hinging edges of said back rest member and of said seat member being substantially straight, said seat and back rest members being constructed of hard sheet material, and means for hinging said back rest member with its hinging edge in abutting relation to said seat rest member adjacent said seat rest member hinging edge, said hinging means comprising at least one aperture through said back rest member adjacent each end of said hinging edge thereof, at least one pair of apertures through said seat rest member adjacent each end of said hinging edge thereof, the apertures of each said pair of apertures through said seat rest member being spaced from each other a distance at least equal to the thickness of said back rest member and located in parallel lines extending normal to said seat rest member hinging edge, said hinging apertures in said back rest members adjacent each end of said hinging edge thereof being spaced a substantial distance from each other, said pairs of hinging apertures in said seat rest members adjacent each end of said hinging edge thereof being spaced a similar substantial distance from each other, and a carrying handle and hinge cord extending loosely between said spaced apart apertures and pairs of apertures, said cord having its ends threaded through one aperture of each said pair of apertures in said seat rest member, then through an aperture at each end of the hinging edge of the back rest member, then through the other aperture of each said pair of apertures in said seat rest member, and then secured on itself, and a brace cord on each side of the seat tied through apertures in the adjoining edges of said seat and back rest members, said brace cord apertures being substantially spaced from said hinging edges, whereby, when in seating position, said back rest member is maintained with its hinging edge in abutting relation on said seat member, and when in folded position, said loosely extending cord between said spaced apart apertures provides a convenient carrying handle extending above the back edge of said seat rest member and the bottom edge of said back rest member when carried thereby.

References Cited in the file of this patent

UNITED STATES PATENTS

| | | |
|---|---|---|
| D. 134,806 | Brown et al. | Jan. 19, 1943 |
| 2,107,880 | Wilsdorf | Feb. 8, 1938 |